United States Patent
Yang et al.

(10) Patent No.: US 10,365,738 B2
(45) Date of Patent: Jul. 30, 2019

(54) TOUCH DISPLAY APPARATUS AND COLOR FILTER SUBSTRATE

(71) Applicants: INTERFACE OPTOELECTRONIC (SHENZHEN) CO., LTD., Shenzhen (CN); GENERAL INTERFACE SOLUTION LIMITED, Miaoli County (TW)

(72) Inventors: Yue-Feng Yang, Hsinchu (TW); Wei-Chung Chuang, Hsinchu (TW); Yen-Heng Huang, Hsinchu (TW); Shih-Ming Kuo, Hsinchu (TW)

(73) Assignees: INTERFACE OPTOELECTRONIC (SHENZHEN) CO., LTD., Shenzhen (CN); GENERAL INTERFACE SOLUTION LIMITED, Zhubei (TW)

( * ) Notice: Subject to any disclaimer, the term of this patent is extended or adjusted under 35 U.S.C. 154(b) by 509 days.

(21) Appl. No.: 15/149,166

(22) Filed: May 8, 2016

(65) Prior Publication Data
US 2016/0328063 A1    Nov. 10, 2016

(30) Foreign Application Priority Data

May 8, 2015 (CN) .......................... 2015 1 0229073

(51) Int. Cl.
G06F 3/041 (2006.01)
G06F 3/044 (2006.01)
G02F 1/1333 (2006.01)
G02F 1/1339 (2006.01)

(52) U.S. Cl.
CPC ............ *G06F 3/0412* (2013.01); *G06F 3/044* (2013.01); *G02F 1/13338* (2013.01); *G02F 1/13394* (2013.01); *G06F 2203/04103* (2013.01); *G06F 2203/04112* (2013.01)

(58) Field of Classification Search
CPC .................. G06F 3/0412; G06F 3/044; G06F 2203/01403; G06F 2203/04112; G06F 3/0418; G06F 3/04; G02F 1/13338; G02F 1/13394; G02F 1/133512; G02B 1/16; H01L 23/60
See application file for complete search history.

(56) References Cited

U.S. PATENT DOCUMENTS

| | | | | |
|---|---|---|---|---|
| 2011/0285641 A1* | 11/2011 | Huang | .................. | G06F 3/0412 345/173 |
| 2012/0169400 A1* | 7/2012 | Liu | ........................ | G06F 3/0416 327/517 |
| 2014/0375909 A1* | 12/2014 | Misaki | .................... | G06F 3/044 349/12 |

(Continued)

*Primary Examiner* — Lunyi Lao
*Assistant Examiner* — Jarurat Suteerawongsa
(74) *Attorney, Agent, or Firm* — ScienBiziP, P.C.

(57) ABSTRACT

A touch display apparatus includes a touch electrode structure and a display assembly. The touch electrode structure senses touch operations on the touch display apparatus. The display assembly displays images of the touch display apparatus. The display assembly includes a polarizer, a first substrate, a color filter, and a second substrate, arranged in that order. The touch electrode structure is sandwiched between the polarizer and the first substrate. The touch electrode structure comprises a first sensing electrode layer. The first sensing electrode is formed on a surface of the first substrate opposite to the color filter.

12 Claims, 6 Drawing Sheets

(56) References Cited

U.S. PATENT DOCUMENTS

2015/0022500 A1\* 1/2015 Kita ........................ G06F 3/044
 345/174
2015/0212617 A1\* 7/2015 Yoo ........................ G06F 3/044
 345/174

\* cited by examiner

TOUCH DISPLAY APPARATUS AND COLOR FILTER SUBSTRATE

CROSS-REFERENCE TO RELATED APPLICATIONS

This application claims priority to Chinese Patent Application No. 201510229073.2 filed on May 8, 2015, the contents of which are incorporated by reference herein.

FIELD

The subject matter herein generally relates to touch displays.

BACKGROUND

A touch display device includes a plurality of sensing electrodes, a plurality of signal lines corresponding to the sensing electrodes, and a processor connected with the signal lines. The sensing electrodes are spaced a predetermined distance from each other. The distance between adjacent electrodes is decreased by a pressure on the touch panel, which causes signal output by the corresponding signal line to be adjusted. The processor processes the signal output by signal line to detect a location of the touch operation on panel.

BRIEF DESCRIPTION OF THE FIGURES

Implementations of the present technology will now be described, by way of example only, with reference to the attached figures.

DETAILED DESCRIPTION

Figure 1:
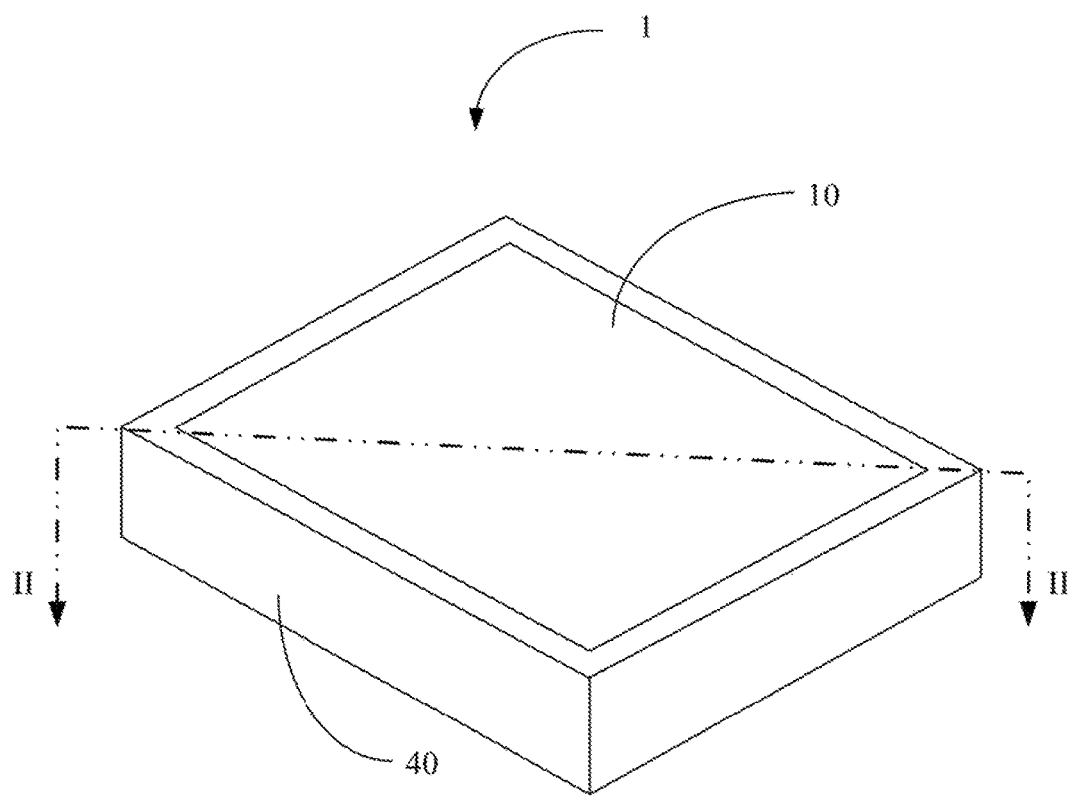
FIG. 1 is an isometric view of an embodiment of a touch display apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

The present disclosure is described in relation to a touch display apparatus.

Figure 2:
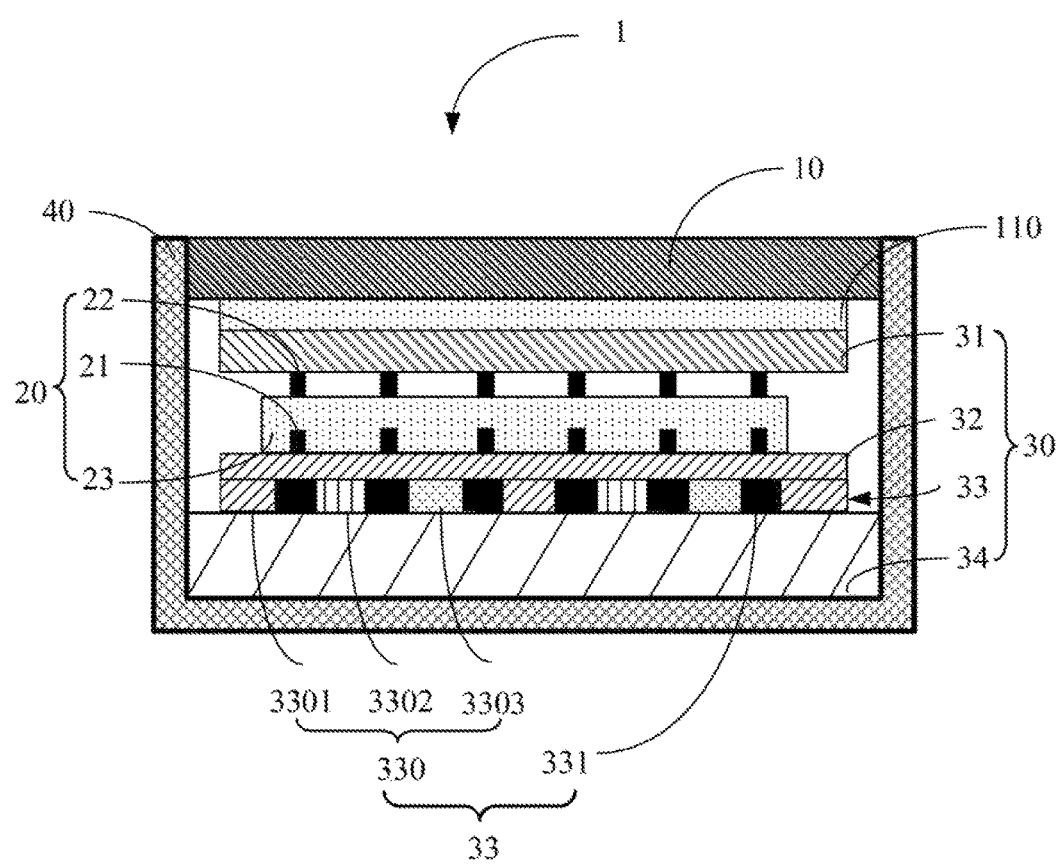
FIG. 2 is a cross-sectional view of the touch display apparatus of FIG. 1, taken along line II-II, showing the touch display apparatus comprising a touch electrode structure and a color filter located on opposite surfaces of a first substrate.

FIG. 1 illustrates an embodiment of a touch display apparatus 1. The touch display apparatus 1 includes a cover glass 10, a touch electrode structure 20 (as shown in FIG. 2), a display assembly 30 (as shown in FIG. 2), and a casing 40. The cover glass 10 and the casing 40 cooperate with each other to form a receiving space for receiving the touch electrode structure 20 and the display assembly 30.

FIG. 2 illustrates the touch display apparatus 1 in cross section. The touch electrode structure 20 senses touch operations on the cover glass 10. The touch electrode structure 20 includes a first sensing electrode layer 21, a second sensing electrode layer 22, and an insulation layer 23. The first sensing electrode layer 21 and the second sensing electrode layer 22 are located at opposite sides of the insulation layer 23. The first sensing electrode layer 21 and the second sensing electrode layer 22 are insulated from each other by the insulation layer 23. The first sensing electrode layer 21 and the second sensing electrode layer 22 are made of a transparent conductive material, such as metal mesh or indium tin oxide (ITO). In at least one embodiment, the first sensing electrode layer 21 and the second sensing electrode layer 22 are made of metal mesh. In other embodiments, the first sensing electrode layer 21 and the second sensing electrode layer 22 are made of ITO to form a double-sided ITO structure.

The insulation layer 23 is made of an electrical insulating material, such as transparent adhesive, dry film, photoresist, or the like. In at least one embodiment, the insulation layer 23 is made of a transparent adhesive with a high light transmittance, such as optical clear adhesive (OCA) or optical clear resin (OCR).

The display assembly 30 displays images of the touch display apparatus 1. The display assembly 30 includes a polarizer 31, a first substrate 32, a color filter 33, and a second substrate 34 arranged in that order. The color filter 33 is located on a surface of the first substrate 32 adjacent to the second substrate 34. The touch electrode structure 20 is attached to a surface of the first substrate 32 opposite to the color filter 33, and is sandwiched between the polarizer 31 and the first substrate 32. In detail, the first sensing electrode layer 21 is formed on the surface of the first substrate 32 opposite to the color filter 33. The insulation layer 23 covers the first sensing electrode layer 21 and the first substrate 32. The second sensing electrode layer 22 is formed on the insulation layer 23.

The polarizer 31 is located above the second sensing electrode layer 22. In at least one embodiment, the polarizer 31 is attached to a surface of the touch electrode structure 20. In other embodiments, the polarizer 31 includes an adhesive layer on a surface facing the touch electrode structure 20, and the polarizer 31 is pasted on the surface of the touch electrode structure 20 by the adhesive layer.

In at least one embodiment, the first substrate 32 is a substrate of the color filter 33, and the second substrate 34 is a TFT array substrate of the display assembly 30. The first substrate 32 is transparent, such as a glass substrate, or transparent, such as a resin substrate.

Figure 3:
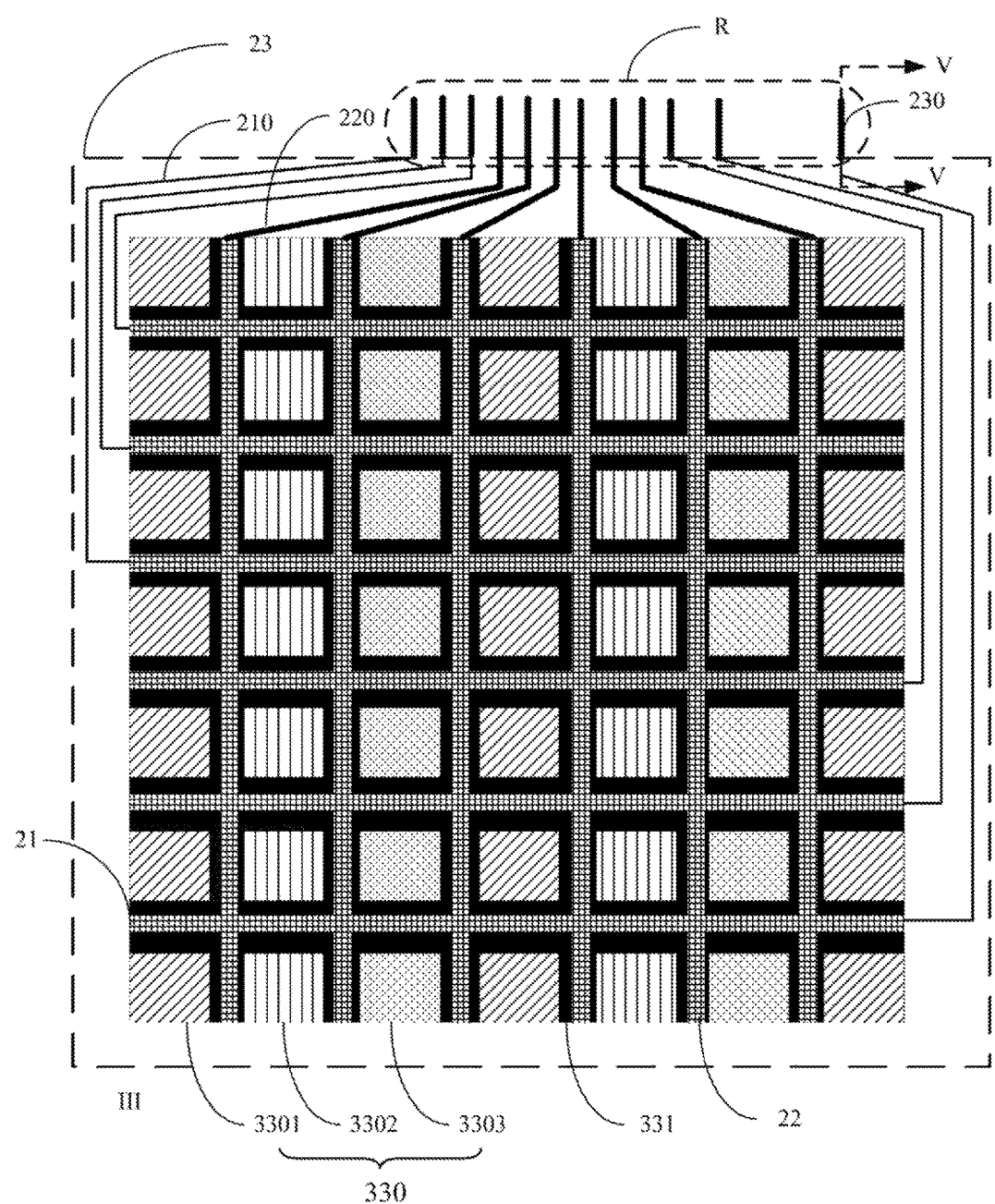
FIG. 3 is a view of the touch electrode structure and the color filter of FIG. 2 located on opposite surfaces of the first substrate of FIG. 2, showing the touch electrode structure connected with a conductive region R.

FIG. 3 illustrates the touch electrode structure 20 and the color filter 33 located on the opposite surfaces of the first substrate 32. The first sensing electrode layer 21 includes a plurality of lines crossing with each other forming a metal mesh, and the second sensing electrode layer 22 includes a plurality of lines crossing with each other forming a metal mesh. The first sensing electrode layer 21 is electrically connected to a connecting region R by a plurality of first conductive lines 210 for establishing an electrical connection with a control circuit (not shown). The second sensing electrode layer 22 is electrically connected to the conductive region R by a plurality of second conductive lines 220 for establishing an electrical connection with the control circuit (not shown). In the conductive region R, each the first conductive lines 210 is covered by a protection line 230. Each protection line 230 protects one first conductive line 210 from being damaged using an etching process for manufacturing the second conductive lines 220. The first conductive lines 210 and the second conductive lines 220 are made of conductive material, for example, one or a combination of aluminum (Al), copper (Cu), molybdenum (Mo), titanium (Ti), nickel (Ni), tungsten (W), gold (Au), palladium (Pd), platinum (Pt), chromium (Cr), neodymium (Nd), zinc (Zn), cobalt (Co), and manganese (Mn). The materials of the first conductive lines 210 and of the second conductive lines 220 can be the same or different. In at least one embodiment, the first conductive lines 210 and the lines of the first sensing electrode layer 21, of the same material, are formed using a metal mesh process, and the second conductive lines 220 and the lines of the second sensing electrode layer 22, of the same material, are formed using a single process. The lines of the first electrode layer 21 and the second electrode layer 22 are formed under a black oxide process, the transmittance ability of each line of the first electrode layer 21 and each line of the second electrode layer 22 is less than 10%.

Figure 4:
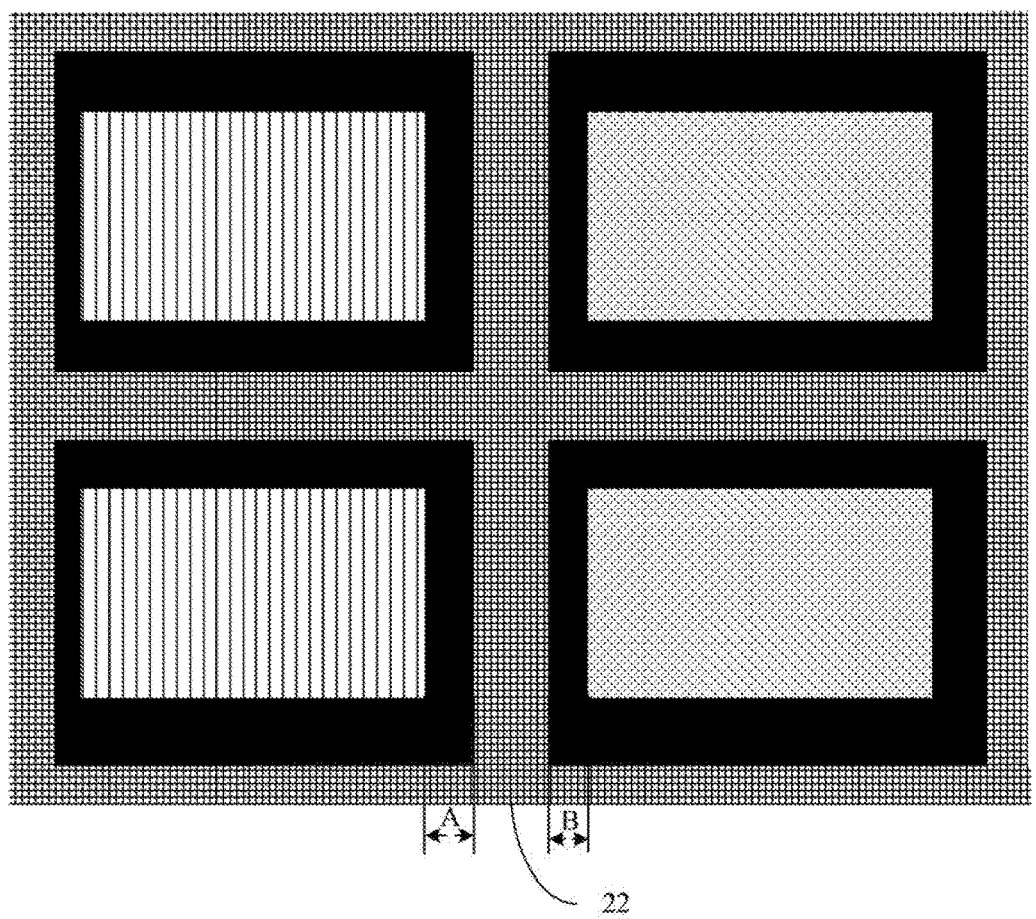
FIG. 4 is a partially enlarged view of the touch electrode structure and the color filter of FIG. 3.

The color filter 33 includes a plurality of filter units 330 and a plurality of spacers 331. The spacers 331 are arranged in a matrix, and each spacer 331 is located between adjacent filter units 330. In at least one embodiment, the filter units 330 includes a plurality of first filter units 3301, a plurality of second filter units 3302, and a plurality of third filter units 3303. In at least one embodiment, each first filter unit 3301 is a red filter unit, each second filter unit 3302 is a green filter, and each third filter unit 3303 is a blue filter. The spacers 331 correspond to the lines of the first sensing electrode layer 21 and the lines of the second sensing electrode layer 22. A width of each spacer 331 along a first direction is greater than a width of the line of the first sensing electrode layer 21 and a width of the line of the second sensing electrode layer 22. As shown in FIG. 4, a first distance A exists between adjacent edges of the second sensing electrode layer 22 and the adjacent filter unit 330 along the first direction, and a second distance B exists between adjacent edges of the second sensing electrode layer 22 and the adjacent filter unit 330 along the first direction. In at least one embodiment, both of the first distances A and B are greater than 0.5 µm, the first distance A and the second distance B being the same. In other embodiments, the first distance A and the second distance B are not the same. The distances existing between adjacent edges of the first sensing electrode layer 21 and the adjacent filter unit 330 along the first direction are greater than 0.5 µm.

Figure 5:
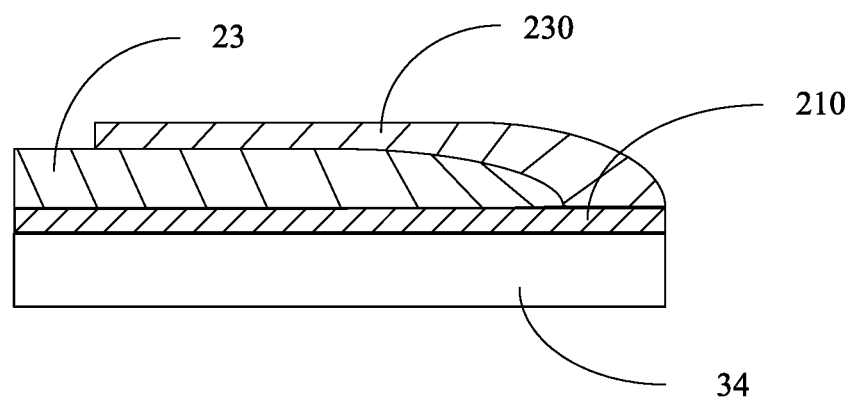
FIG. 5 is a cross-sectional view of the conductive region R of FIG. 3, taken along a line V-V, the conductive region comprising a plurality of first conductive lines, a plurality of second conductive lines, and a plurality of protection lines.
Figure 6:
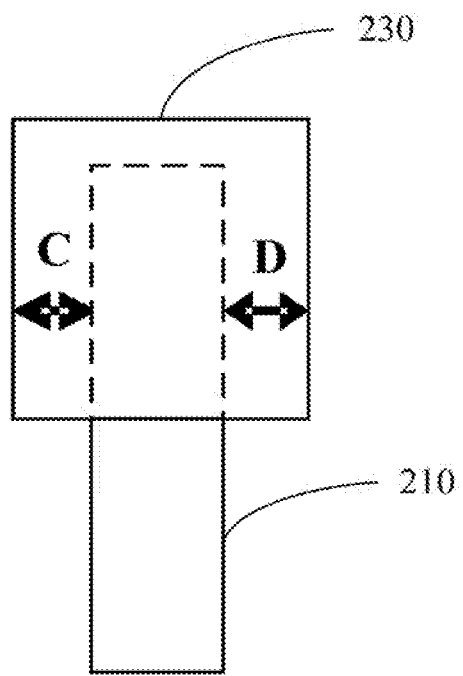
FIG. 6 is a plan view of a protection line and a first conductive line of FIG. 5.

FIG. 5 illustrates the conductive region R taken along line V-V of FIG. 3. The protection line 230 covers the first conductive lines 210 and the insulation layer 23. The protection lines 230 and the second conductive lines 220, being of the same material, are simultaneously formed in one process. As shown in FIG. 6, a width of the protection line 230 is greater than a width of the first conductive line 210. A third distance C and a fourth distance D exist between adjacent edges of the protection line 230 and the corresponding first conductive line 210 along the first direction. In at least one embodiment, a width of the protection line 230 is less than 1 µm, and the third distance C is equal to the fourth distance D. In other embodiments, the third distance C is different from to the fourth distance D.

In the touch display apparatus 1, the touch electrode structure 20 is directly formed on the first substrate 32 of the display assembly 30, thus a thickness of the touch display apparatus is reduced. The first lines of the sensing electrode layer 21 and the lines of the second sensing electrode layer 22 correspond to the spacers 331, thus a display performance of the touch display apparatus 1 is improved.

While various exemplary and preferred embodiments have been described, the disclosure is not limited thereto. On the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A touch display apparatus comprising:
   a touch electrode structure configured to sense touch operations on the touch display apparatus; and
   a display assembly configured to display images of the touch display apparatus; wherein the display assembly comprises a polarizer, a first substrate, a color filter, a second substrate arranged in that order; the touch electrode structure is sandwiched between the polarizer and the first substrate; the touch electrode structure comprises a first sensing electrode layer, a second sensing electrode layer, and an insulation layer; the first sensing electrode layer is formed on a surface of the first substrate opposite to the color filter, each of the first sensing electrode layer and the second sensing electrode layer comprises a plurality of lines forming a metal mesh; the insulation layer covers an upper surface and side surfaces of each of the plurality of lines of the first sensing electrode; the second sensing electrode parallel with the first sensing electrode layer is disposed on a surface of the insulation layer opposite to the first sensing electrode layer; the first sensing electrode layer is electrically connected to a conductive region by a plurality of first conductive lines formed on the second substrate, each first conductive line is covered by the insulation layer, and a portion of each first conductive line exposed from the insulation layer in the conductive region is covered by a protection line; a portion of the protection line is coplanar with the insulation layer, and a portion of the protection line covers a surface of the insulation layer away from the first conductive line, the protection line is made of conductive material.

2. The touch display apparatus of claim 1, wherein the display assembly further comprises a plurality of filter units and a plurality of spacers, each the spacers is located between two adjacent filter units; each spacer corresponds to one of the lines of the first sensing electrode layer and one of lines of the second electrode layer.

3. The touch display apparatus of claim 2, wherein a width of the spacer is greater than both a width of the line of the first sensing electrode layer and a width of the line of the second sensing electrode layer.

4. The touch display apparatus of claim 3, wherein a first distance between an edge of the line of the first sensing electrode layer and an adjacent edge of the corresponding spacer is greater than 0.5 μm.

5. The touch display apparatus of claim 3, wherein a second distance between an edge of the line of the second sensing electrode layer and an adjacent edge of the corresponding spacer is greater than 0.5 μm.

6. The touch display apparatus of claim 1, wherein a light transmittance of a line of the first sensing electrode layer and a line of the second sensing electrode layer is less than 10%.

7. The touch display apparatus of claim 1, wherein the second sensing electrode layer is electrically connected to the conductive region by a plurality of second conductive lines, the second conductive lines and the protection lines are formed using a single process.

8. The touch display apparatus of claim 1, wherein a width of the protection line along a first direction is greater than a width of the first conductive lines.

9. A color filter substrate comprising:
a first substrate;
a touch electrode structure formed on a surface of the first substrate; and
a color filter formed on a surface of the first substrate opposite to the touch electrode structure;
wherein the touch electrode structure comprises a first sensing electrode layer, a second sensing electrode layer, and an insulation layer; each of the first sensing electrode layer and the second sensing electrode layer comprises a plurality of lines forming a metal mesh; the insulation layer covers an upper surface and side surfaces of each of the plurality of lines of the first sensing electrode; the second sensing electrode parallel with the first sensing electrode layer is disposed on a surface of the insulation layer opposite to the first sensing electrode layer; the first sensing electrode layer is formed on the first substrate and directly connects with the first substrate, each first conductive line is covered by the insulation layer, and a portion of each first conductive line exposed from the insulation layer in the conductive region is covered by a protection line; a portion of the protection line is coplanar with the insulation layer, and a portion of the protection line covers a surface of the insulation layer away from the first conductive line, the protection line is made of conductive material.

10. The color filter substrate of claim 9, wherein the color filter substrate further comprises a plurality of filter units and a plurality of spacers, each the spacers is located between two adjacent filter units; each spacer corresponds to one of lines of the first sensing electrode layer and one of the lines of the second electrode layer.

11. The color filter substrate of claim 10, wherein a width of the spacer is greater than a width of the line of the first sensing electrode layer and a width of the line of the second sensing electrode layer.

12. The color filter substrate of claim 11, wherein a first distance between an edge of the line of the first sensing electrode layer and an adjacent edge of the line of the corresponding spacer is greater than 0.5 μm.

* * * * *